(12) United States Patent
Guedon et al.

(10) Patent No.: US 10,013,130 B2
(45) Date of Patent: Jul. 3, 2018

(54) COMPENSATION FOR VARIATIONS IN A CAPACITIVE SENSE MATRIX

(71) Applicant: STMicroelectronics Asia Pacific Pte Ltd, Singapore (SG)

(72) Inventors: Yannick Guedon, Singapore (SG); Sze-Kwang Tan, Singapore (SG); Dianbo Guo, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 15/840,438

(22) Filed: Dec. 13, 2017

(65) Prior Publication Data

US 2018/0101266 A1   Apr. 12, 2018

Related U.S. Application Data

(62) Division of application No. 14/945,620, filed on Nov. 19, 2015, now Pat. No. 9,874,986, which is a division of application No. 13/629,877, filed on Sep. 28, 2012, now Pat. No. 9,223,448.

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01); *G06F 3/0416* (2013.01); *G06F 2203/04103* (2013.01); *G06F 2203/04108* (2013.01)

(58) Field of Classification Search
None
See application file for complete search history.

(56) References Cited

U.S. PATENT DOCUMENTS

| 2010/0045630 A1 | 2/2010 | Gu et al. |
| 2011/0234528 A1 | 9/2011 | Guedon et al. |

*Primary Examiner* — Robin Mishler
(74) *Attorney, Agent, or Firm* — Crowe & Dunlevy

(57) ABSTRACT

A readout device for a capacitive sense matrix includes a computer readable storage medium configured to store capacitance data. The capacitance data represents capacitance values of the capacitive sense matrix. The readout device also includes a readout circuit configured to receive a signal from the capacitive sense matrix, the readout circuit being configured based upon the capacitance data. Also described are a readout method and a method of compensating for variations in capacitance.

18 Claims, 6 Drawing Sheets

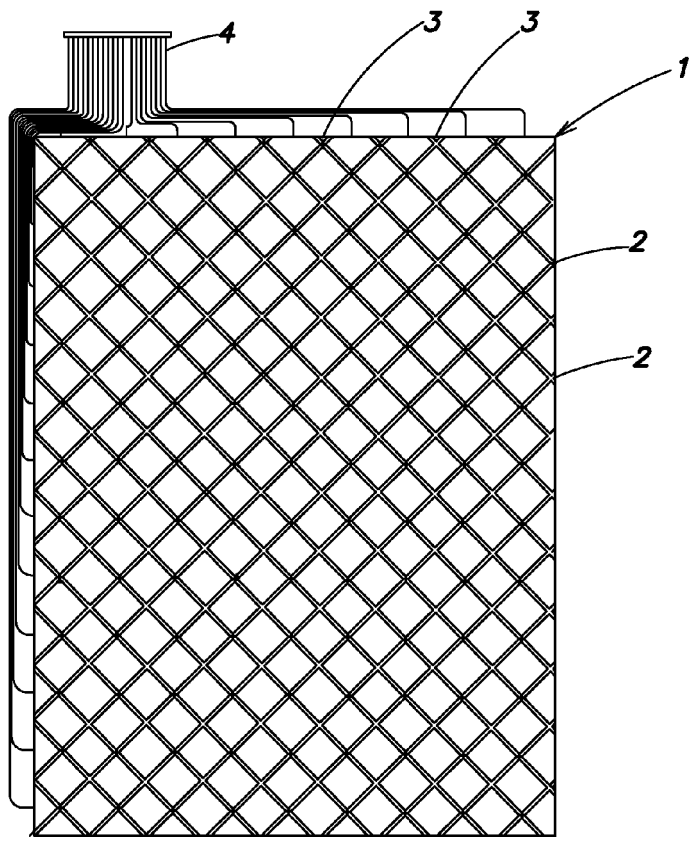
FIG. 1A
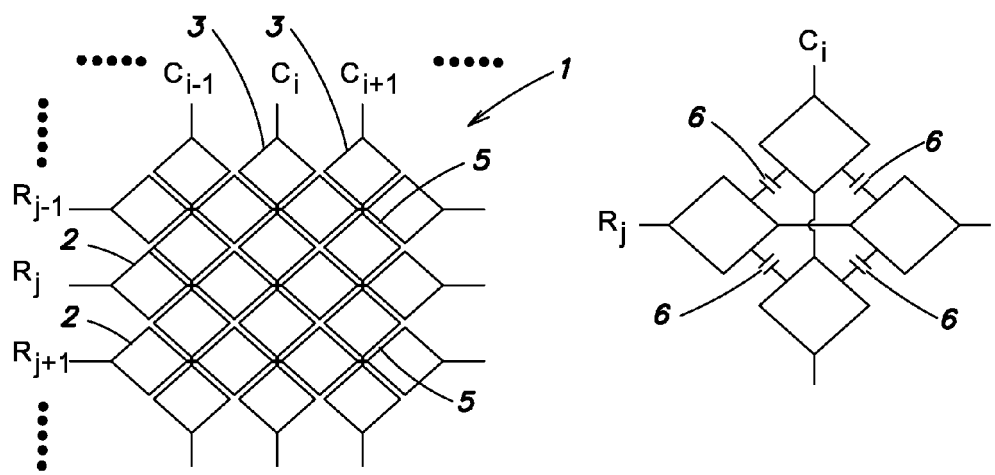
FIG. 1B  FIG. 1C

COMPENSATION FOR VARIATIONS IN A CAPACITIVE SENSE MATRIX

CROSS REFERENCE TO RELATED APPLICATION

This application is a divisional application from U.S. patent application Ser. No. 14/945,620 filed Nov. 19, 2015, which is a divisional application from U.S. patent application Ser. No. 13/629,877 filed Sep. 28, 2012 (now U.S. Pat. No. 9,223,448), the disclosures of which are incorporated by reference.

TECHNICAL FIELD

The techniques described herein relate generally to capacitive detection and more specifically to capacitive detection using a capacitive sense matrix. The techniques described herein may be used in connection with touch or proximity detection using a touch panel, for example.

BACKGROUND

A touch panel is a device that can detect an object, such as a finger or stylus, in contact with the touch panel. Touch panels can measure various parameters of the user's touch, such as the location at which the touch occurs on the panel, the duration of a touch event, etc. Touch panels can be included in devices such as touch screens and touchpads.

A touch screen is a device that can display images and also detect an object in contact with the screen. Touch screens are used as a user interface in various applications such as mobile phones, tablet computers, etc.

A touchpad is a user interface that enables a user to provide a touch input. Touchpads are used in applications such as laptop computers, in which user input is provided through the touchpad (e.g., to move a cursor) and images are displayed on a separate screen.

One type of touch panel is a capacitive touch panel. Capacitive touch panels include a capacitive sense matrix including conductive rows and columns. In operation, the capacitance between each row and column of the matrix may be detected. A change in capacitance between a row and column can indicate that an object is touching the touch panel near the region of intersection of the row and column.

SUMMARY

Some embodiments relate to a readout device for a capacitive sense matrix. The readout device includes a computer readable storage medium configured to store capacitance data. The capacitance data represents capacitance values of the capacitive sense matrix. The readout device also includes a readout circuit configured to receive a signal from the capacitive sense matrix. The readout circuit is configured based upon the capacitance data.

Some embodiments relate to a readout method for a capacitive sense matrix. The readout method includes storing capacitance data representing capacitance values of the capacitive sense matrix, configuring a readout circuit for the capacitive sense matrix based upon the capacitance data, and receiving, by the readout circuit, a signal from the capacitive sense matrix.

Some embodiments relate to a readout device for a capacitive sense matrix. The readout device includes means for storing capacitance data. The capacitance data represents capacitance values of the capacitive sense matrix. The readout device also includes a readout circuit configured to receive a signal from the capacitive sense matrix. The readout circuit is configured based upon the capacitance data.

Some embodiments relate to a readout device for a capacitive sense matrix. The readout device includes a computer readable storage medium configured to store capacitance data. The capacitance data represents capacitance values of the capacitive sense matrix. The readout device also includes readout means for receiving a signal from the capacitive sense matrix. The readout means is configured based upon the capacitance data.

In an embodiment, a readout device for a capacitive sense matrix including a capacitive intersection associated with a force node and a sense node, wherein said force node is configured to receive a drive signal, comprises: a differential amplifier having an input and an output, wherein said input is coupled to the sense node; a first capacitor coupled between the input and output of the differential amplifier; and a series connection of an inverter and a second capacitor coupled between said force node and said input of the differential amplifier; wherein said second capacitor comprises a variable capacitor having a variable capacitance value.

In an embodiment, a readout device for a capacitive sense including a capacitive intersection associated with a force node and a sense node, wherein said force node is configured to receive a drive signal, comprises: a capacitor, different from the capacitive intersection, coupled to the force node and having a variable capacitance set by value obtained from capacitance data representing an expected capacitance of the capacitive intersection; and an integration circuit having an input configured to receive a first signal from the capacitive intersection and configured to receive a second signal from the capacitor having the variable capacitance value, the integration circuit operating to determine a difference between the first and second signals and generate an output signal as a function of both a sensed capacitance at the capacitive intersection as indicated by the first signal and the expected capacitance as indicated by the second signal.

In an embodiment, a readout device for a capacitive sense matrix including a plurality of first capacitors each comprised of a capacitive intersection associated with a force node and a sense node, wherein said force node is configured to receive a drive signal, comprises: a memory configured to store capacitance data representing an expected capacitance value of one or more of the first capacitors of the capacitive sense matrix; a differential amplifier having an input and an output, wherein said input is coupled to the sense node; a first capacitor coupled between the input and output of the differential amplifier; a series connection of an inverter and a second capacitor between said force node and said input of the differential amplifier; wherein said second capacitor is different from any of the first capacitors of the capacitive sense matrix; and wherein said second capacitor comprises a variable capacitor having a variable capacitance set by the capacitance data representing the expected capacitance value of one or more of the first capacitors of the capacitive sense matrix stored in the memory.

The foregoing summary is provided by way of example and is not intended to be limiting. All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

In the drawings, each identical or nearly identical component that is illustrated in various figures is represented by a like reference character. For purposes of clarity, not every component may be labeled in every drawing.

FIG. 1A shows an example of a capacitive touch panel.

FIG. 1B shows a capacitive sense matrix of a capacitive touch panel.

FIG. 1C shows the capacitance between a row and a column of the capacitive sense matrix.

DETAILED DESCRIPTION

Figure 2:
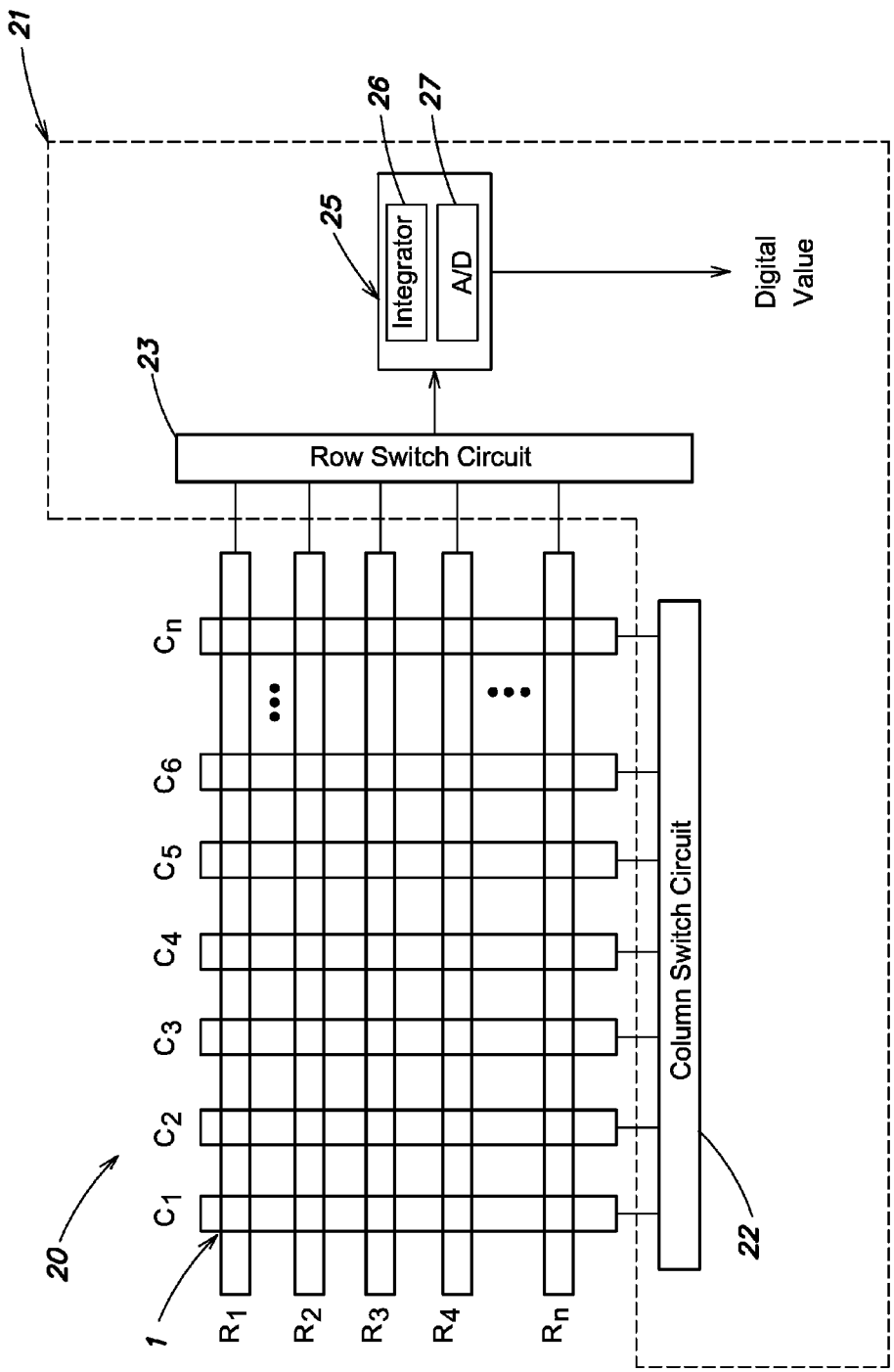
FIG. 2 shows a block diagram of a detection system that includes a capacitive sense matrix and a readout device.

Described herein are readout devices and techniques for capacitive touch detection that may be used with any of a variety of devices that include a capacitive sense matrix. The inventors have recognized and appreciated that the capacitance between rows and columns of a capacitive sense matrix may vary across the capacitive sense matrix due to manufacturing variations, for example. According to some embodiments, touch detection can be improved by compensating for variations in capacitance across the touch panel. For example, capacitance data representing capacitance values across the capacitive sense matrix can be stored, and a readout circuit coupled to the capacitive sense matrix can be configured based upon the stored capacitance data.

FIG. 1A shows an example of a capacitive touch panel having conductive rows 2 and columns 3 of a capacitive sense matrix 1 arranged in a diamond pattern. When the capacitive touch panel is included in a touch screen, capacitive sense matrix 1 may be transparent to allow light from an underlying display unit to pass through the capacitive sense matrix 1 for viewing by a user. FIG. 1A also shows that a plurality of conductors 4 may be provided for making contact to the conductive rows 2 and columns 3. In some embodiments, the conductive rows 2 and columns 3 may cover substantially the entire face of the capacitive touch panel, enabling touch and proximity detection at substantially any location on the capacitive touch panel.

FIG. 1B shows the capacitive sense matrix 1 in further detail. The capacitive sense matrix 1 includes a plurality of conductive columns 3 (C) and a plurality of conductive rows 2 (R). The conductive rows 2 and columns 3 may be formed of any suitable conductive material. The conductive columns 3 extend vertically and the conductive rows 2 extend horizontally as illustrated in FIG. 1B. The conductive rows 2 and columns 3 cross above/below each other at their region of intersection (as viewed from above) such that they are not in contact with one another. The conductive rows 2 and columns 3 may be separated from one another by an insulating material. As a result, individual row and column conductors 2, 3 are separated from each other by capacitive gaps 5. In this example, each of the conductive rows 2 and columns 3 has conductors arranged in a diamond pattern. The diamond-shaped pattern of conductive rows 2 and columns 3 may provide for increased capacitance between the conductive rows 2 and columns 3. However, conductive rows 2 and columns 3 may be formed in any suitable shape. In operation, capacitive sense matrix 1 may detect an object that modifies the fringing electric field in the vicinity of the capacitive gaps 5 when in contact with the touch panel or in the proximity of the touch panel.

FIG. 1C shows that when a conductive column $C_i$ and row $R_j$ are selected, the total capacitance between column $C_i$ and row $R_j$ is the sum of four capacitances 6 arising between the four adjacent diamond-shaped regions of column $C_i$ and row $R_j$. The capacitance between column $C_i$ and row $R_j$ can be measured to determine whether an object is in contact with or in the proximity of the capacitive sense matrix in which the four capacitances 6 are formed.

FIG. 2 is a block diagram of a capacitive detection system 20 that includes the capacitive sense matrix 1 and an associated readout device 21, according to some embodiments. The readout device 21 includes a column switch circuit 22 for selection of one or more columns and a row switch circuit 23 for selection of one or more rows of the capacitive sense matrix.

During a measurement interval for a selected at least one row and at least one column, charge sensed from the capacitive sense matrix 1 may be integrated into a voltage and converted into a digital value by capacitance to digital converter 25. The amount of charge stored depends on the capacitance between the row/column pair. The capacitance between the selected row and column may change when an object is touching the touch panel near the intersection area of the row and column and alters the electric field in this region. To determine whether an object is present, the stored charge can be read out and converted into voltage that is then digitized. The capacitance to digital converter 25 may include an integrator 26 for converting a detected charge into a voltage and an analog-to-digital converter 27 for converting the voltage into a digital value.

By scanning the touch panel, outputs may be determined for each position on the touch panel, and these outputs may be processed to determine the user inputs applied to the touch panel. For example, a measurement may be performed for each intersection of a row and column in the touch panel. A first measurement may be performed for the intersection of column $C_1$ and row $R_1$, and a second measurement may be performed for the intersection of column $C_1$ and row $R_2$, etc. Any suitable scanning technique may be used. In some cases, measurements for an entire column may be performed in parallel. When a plurality of measurements are performed in parallel, a plurality of capacitance to digital converters 25 may be included in the readout device 21 to perform the plurality of measurements at the same time. For example, when an entire column is read out in parallel, a capacitance to digital converter 25 may be present for each row of the capacitive sense matrix 1. In such an implementation, a total of n capacitance to digital converters 25 may be present. The columns of the matrix may be read out in sequence. For example, column 1 may be read out, followed by column 2, etc., until the entire array has been scanned. However, the columns may be read out in any suitable order. In some implementations, the columns need not be read out in parallel. For example, a serial scanning technique may be used whereby each measurement for a selected row and column is performed sequentially. In such an implementation, a single capacitance to digital converter 25 may be used. The techniques described herein are not limited as to the particular scanning technique used to perform readout from the capacitive sense matrix 1.

In some embodiments, the capacitance between more than one row and/or column can be sensed at a time. Sensing the capacitance between more than one row and/or column at a time may enable increasing the sensitivity with which objects can be detected in the vicinity of the capacitive sense matrix. Sensing the capacitance between more than one row and/or column at a time may enable detecting an object, such as a finger or stylus, that is in the proximity of the capacitances between the selected rows/columns even though the object may not be in contact with the touch panel. Thus, an approaching object may be detected when it comes within a small enough distance of the touch panel prior to the object coming into contact with the touch panel.

Figure 3:
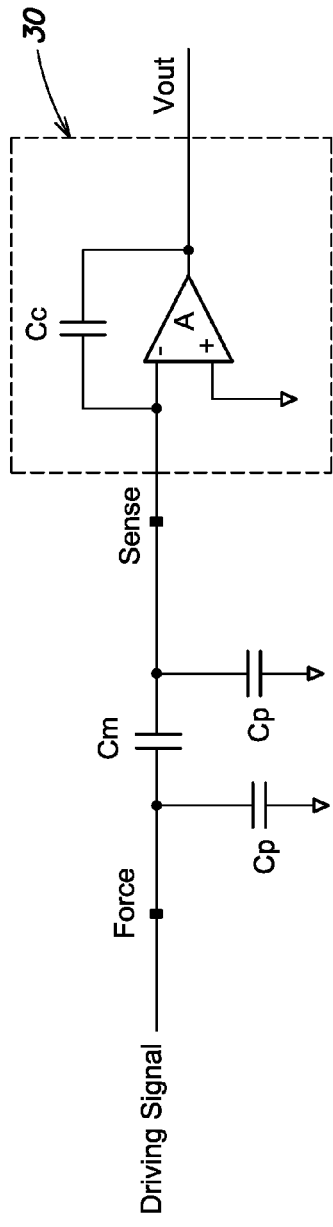
FIG. 3 shows an example of a readout circuit for a capacitive sense matrix.

FIG. 3 shows an example of a readout circuit 30 for a capacitive sense matrix. The "force" node illustrated in FIG. 3 represents a selected row of the touch panel to which a driving signal is applied. The "sense" node represents a selected column of the touch panel from which a signal is sensed. As discussed above, a capacitance Cm (termed a "mutual capacitance") is present between the selected force and sense nodes of the selected row and column. The techniques described herein are not limited to the choice of a row or column as the force or sense node, as in some embodiments a column may be used as a force node and a row may be used as the sense node.

The readout circuit 30 includes an integrator having an amplifier A and a capacitive element Cc. Amplifier A may be an operational amplifier having an inverting input connected to the sense node and a non-inverting input connected to a common mode voltage, e.g., ground. The inverting input may be considered to be at a virtual ground. Capacitive element Cc (e.g., a capacitor) is connected between the inverting input of the amplifier A and the output of the amplifier A. As illustrated in FIG. 3, parasitic capacitances Cp may be present between the source node and the common mode voltage and/or between the force node and the common node voltage. Amplifier A produces an output voltage Vout that may be provided to one or more additional circuits for further processing, such as a demodulator and/or an analog to digital converter, for example.

In operation, a step voltage Vforce can be applied to the force node as a driving signal. In response to the driving signal, the output of amplifier A produces a voltage Vout according to the following expression:

$$Vout = -Vforce*Cm/Cc$$

The output Vout thus depends on the mutual capacitance Cm between the force and sense nodes. When an object such as a finger contacts the touch panel at or near the region of intersection of the selected row and column of the touch panel, a portion of the charge stored by the mutual capacitance Cm can be reduced. For example, the mutual capacitance Cm may appear to be reduced by 10%. As a result, the voltage Vout will be reduced in proportion to fraction of charge removed from the mutual capacitance Cm. As an example, when the value Cm is reduced by 10%, Vout is reduced by 10%. The reduction in Vout can be sensed to detect that a touch has occurred in the proximity of the region of intersection of the selected row and column of the touch panel.

In such an implementation, the capacitance of capacitive element Cc may need to be selected such that Vout will not exceed the maximum output voltage of the amplifier A. The dynamic range is limited, as the output voltage swing of the amplifier A will be between about 90% and 100% of the maximum output voltage, in this example.

Figure 4:
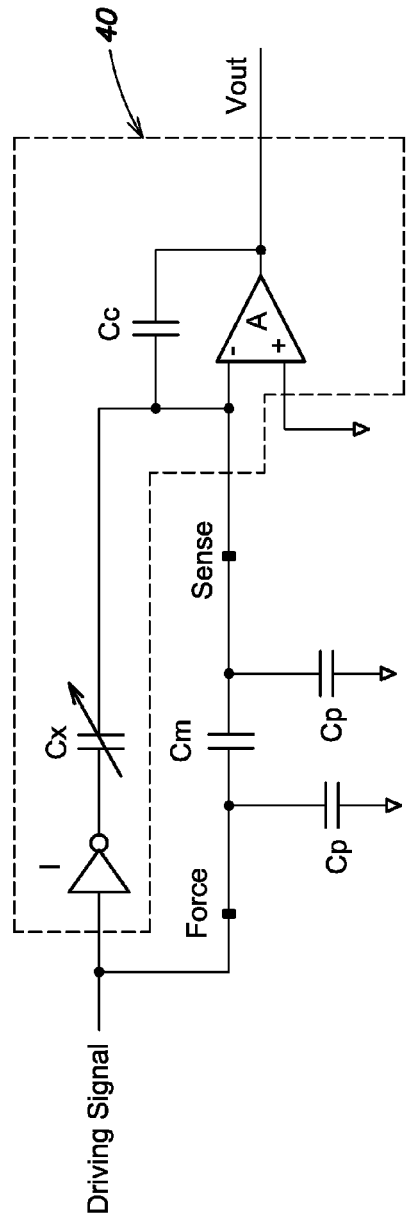
FIG. 4 shows another example of a readout circuit for a capacitive sense matrix, according to some embodiments.

FIG. 4 shows an embodiment of a readout circuit 40 having improved dynamic range.

Readout circuit 40 includes an inverter I and capacitive element Cx in addition to amplifier A and capacitor Cc. The input of the inverter I is connected to receive the driving signal, and the output of the inverter I is connected to a first terminal of the capacitive element Cx. The second terminal of the capacitive element Cx is connected to the sense node, as shown in FIG. 4. In such an implementation, the value of Cx may be set equal to the expected value of Cm. Cx may be a variable capacitance circuit that is programmed based on one or more Cm values measured in the touch panel. For example, Cx may be set to be equal to an average value of the values Cm across the touch panel, or an approximation thereto.

In operation, a driving signal, such as a step voltage Vforce, can be applied to the force node. The output voltage Vout of the amplifier A is expressed by the following equation:

$$Vout = -(Vforce*Cm - Vforce*Cx)/Cc$$

If Cx is equal to Cm, and no touch input is received, Vout=0. When a touch input occurs, Cm appears to decrease (e.g., 10%, by way of example). As a result, Vout=0.1*Vforce*Cm/Cc. As a result of the use of inverter I and capacitive element Cx as discussed above, the maximum voltage at the output of the amplifier A can be significantly decreased (e.g., to 10% of the maximum output voltage previously needed). In some embodiments, the capacitive element Cc may be reduced in size to take advantage of the increased dynamic range.

If there is variation in the mutual capacitance Cm at different positions on the touch panel, and a single value of Cx is used for all measurements, the output voltage Vout can deviate from its expected value. The output voltage swing of Vout will increase, which reduces the dynamic range.

In some embodiments, compensation for the variation in the mutual capacitance across the touch panel can be performed. Capacitance data regarding the variation in capacitance across the touch panel can be obtained and stored in one or more computer readable storage mediums, such as a memory, register, etc. Based on the stored capacitance data, the capacitance of the capacitive element Cx can be modified. For example, the capacitance of Cx can be modified to be equal to or approximately equal to the value of Cm measured for a particular intersection of a row and column of the touch panel. The variation in output voltage of the amplifier A can thereby be reduced. The capacitance Cx may be set by in any suitable way, such as using a controller, for example.

Figure 5:
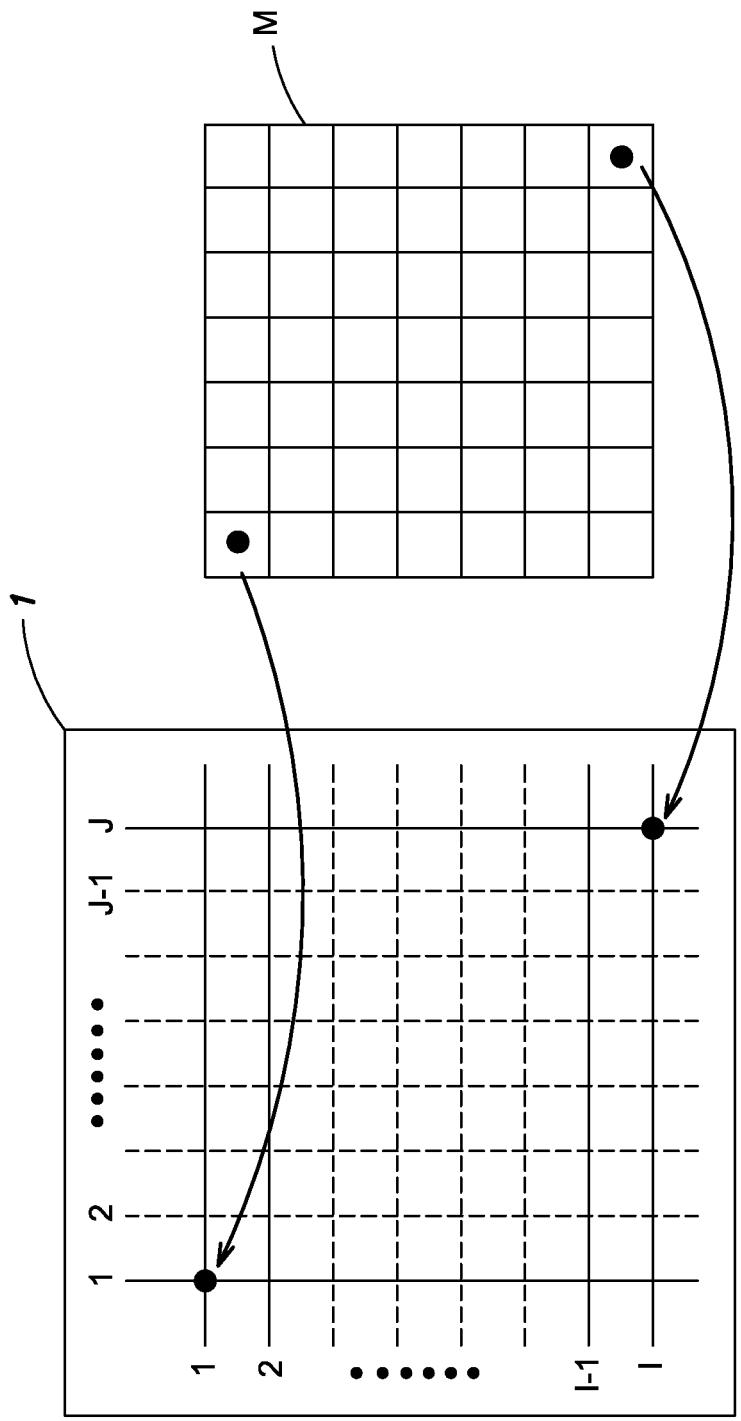
FIG. 5 illustrates a technique for storing capacitance data in memory, according to some embodiments.

FIG. 5 shows an embodiment in which a touch panel includes a plurality of rows numbered 1-I and a plurality of columns numbered 1-J. In some embodiments, data representing the mutual capacitance between each pair of intersecting rows and columns can be stored in a memory M. For example, data representing the mutual capacitance between a first row and a first column may be stored in a first location, data representing the mutual capacitance between the first row and a second column may be stored in a second location, etc. In one implementation, as illustrated in FIG. 5, the memory locations at which the data is stored in a memory M may correspond to the positions of the respective intersections of rows and columns in the touch panel. In such an embodiment, the memory M may have a size of at least I*J*K, where K is the number of bits used to represent capacitance information for each location. However, the techniques described herein are not limited in these respects, as data may be stored in any suitable way. In some embodiments, capacitance data is not stored for every intersection between a row and a column of the touch panel. Accordingly, the amount of capacitance data stored can be reduced.

Figure 6:
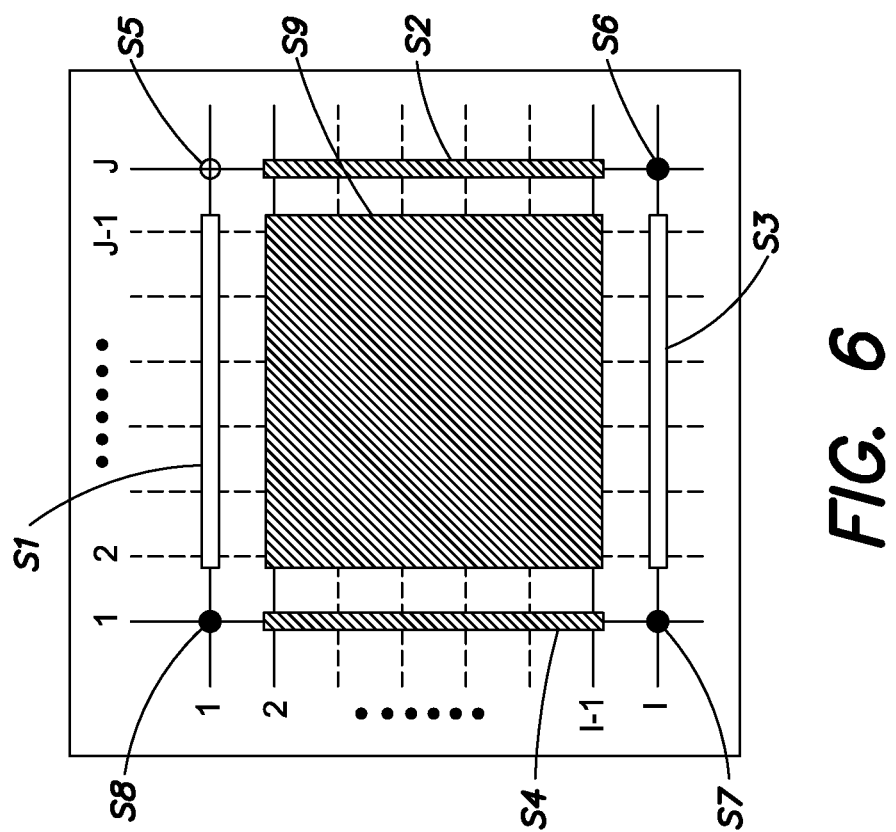
FIG. 6 illustrates segments of a touch panel for which capacitance data may be stored, according to some embodiments.

FIG. 6 illustrates an embodiment in which a touch panel is divided into a plurality of segments. Specifically, the touch panel illustrated in FIG. 6 is shown to include nine segments. In this example, four segments S1-S4 correspond to the four sides of the touch panel, four segments S5-S8 correspond to the four corners of the touch panel, and one segment S9 corresponds to the central portion of the touch panel. Capacitance data may be stored for each segment that is representative of the mutual capacitance(s) of intersection (s) between rows and columns within the segment. Where a segment includes a single intersection, such as a corner segment, the capacitance data stored may represent a measured value for the intersection or an approximation thereto. Where a segment includes a plurality of intersections, such as an edge segment, the capacitance data stored for the segment may be representative of the capacitances of the plurality of intersections in the segment, such as an average value or a median value, for example. As another example, a capacitance value may be measured from an intersection within a segment, and the capacitance data stored for the segment may represent the measured capacitance value for the intersection chosen. When capacitance data is stored for segments of a touch panel, any suitable number of segments may be used, e.g., two or more segments. In an embodiment in which two segments are used, a first portion of the touch panel may be considered as a first segment and the remaining portion of the touch panel may be considered as the second segment.

Since Cx may be set equal to Cm for each intersection and/or segment, the stored data representing the mutual capacitance Cm may also be considered to represent the desired value of Cx.

Capacitance data may be stored as digital values representing a value of capacitance. In some cases, capacitance data may be stored in a compressed format. In one example, capacitance data may be stored representing a "coarse" value of capacitance and a "fine" adjustment. For example, if the mutual capacitances in the touch panel are determined to be between 4.5 pF and 5.0 pF, a "coarse" value of Cx, Cx_coarse, may be set to represent the minimum capacitance value of 4.5 for the panel. For each intersection or segment, a "fine" value, Cx_fine, may be stored representing a capacitance value between 0 pF and 0.5 pF. The value of Cx can then be set by summing Cx_coarse and Cx_fine for a particular intersection or segment. Such a technique may enable reducing the number of bits that need to be stored, and thus the amount of storage required. The capacitance values may be represented in any suitable way.

The individual mutual capacitance values Cm may be measured using any suitable technique, such as those known in the art. In some cases, the value of Cm may be determined using the circuit of FIG. 4. With Cx set to a known value, the value of Vout depends upon Cm as specified in the equation above, and Cm can thereby be determined. The stored capacitance data used to set Cx for individual intersections or segments may be set based on the measured values of Cm.

In some embodiments, techniques described herein such as setting the value of Cx and storing capacitance data may be carried out using one or more computing devices. Embodiments are not limited to operating with any particular type of computing device.

Figure 7:
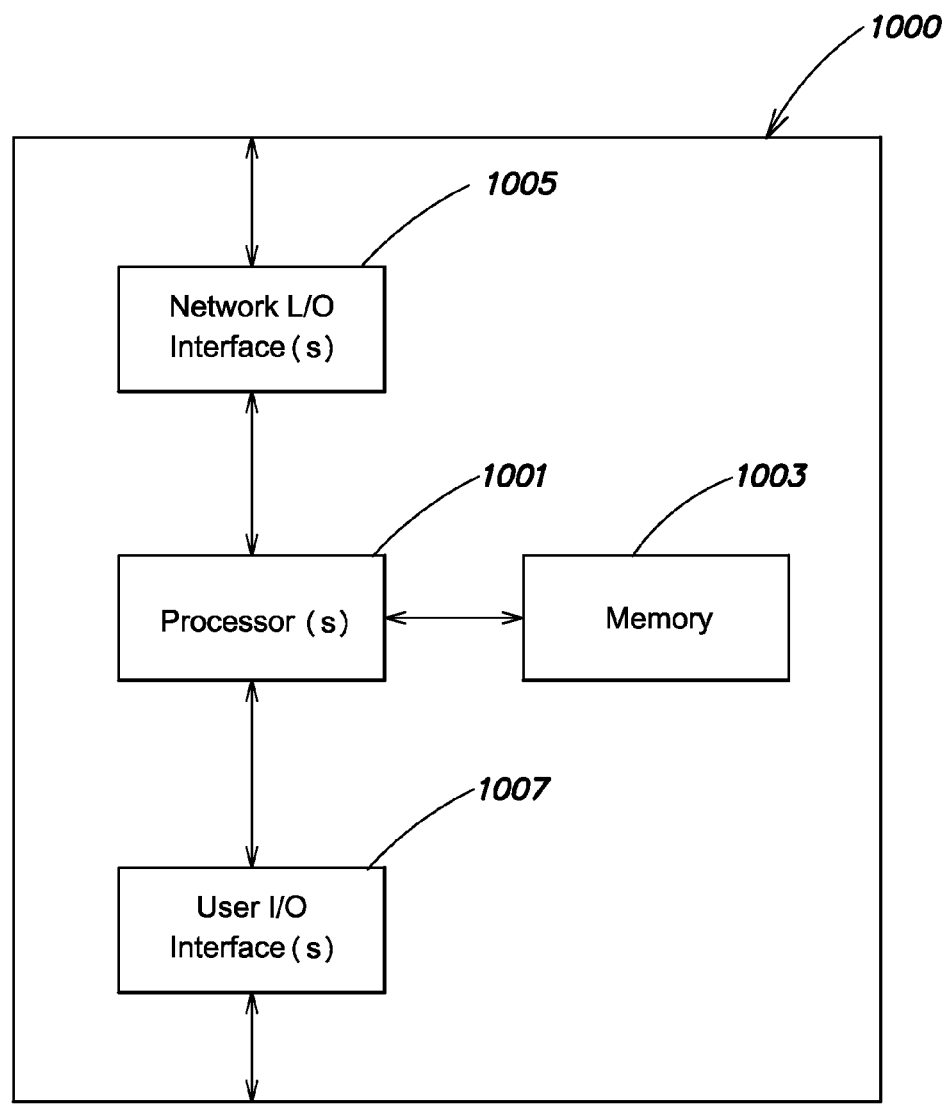
FIG. 7 is a block diagram of an exemplary computing device.

FIG. 7 is a block diagram of an illustrative computing device 1000 that may be used to implement any of the above-described techniques. Computing device 1000 may include one or more processors 1001 and one or more tangible, non-transitory computer-readable storage media (e.g., memory 1003). Memory 1003 may store, in a tangible non-transitory computer-recordable medium, computer program instructions that, when executed, implement any of the above-described functionality. Processor(s) 1001 may be coupled to memory 1003 and may execute such computer program instructions to cause the functionality to be realized and performed.

Computing device 1000 may also include a network input/output (I/O) interface 1005 via which the computing device may communicate with other computing devices (e.g., over a network), and may also include one or more user I/O interfaces 1007, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

The techniques and apparatus described herein are not limited in its application to the details of construction and the arrangement of components set forth in the foregoing description or illustrated in the drawings. The techniques and apparatus described herein are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment, it is to be appreciated various alterations, modifications, and improvements will readily occur to those skilled in the art. Accordingly, the foregoing description and drawings are by way of example only.

The invention claimed is:

1. A readout device for a capacitive sense including a capacitive intersection associated with a force node and a sense node, wherein said force node is configured to receive a drive signal, comprising:
    a capacitor, different from the capacitive intersection, coupled to the force node and having a variable capacitance set by value obtained from capacitance data representing an expected capacitance of the capacitive intersection; and
    an integration circuit having an input configured to receive a first signal from the capacitive intersection and configured to receive a second signal from the capacitor having the variable capacitance value, the integration circuit operating to determine a difference between the first and second signals and generate an output signal as a function of both a sensed capacitance at the capacitive intersection as indicated by the first signal and the expected capacitance as indicated by the second signal.

2. The readout device of claim 1, further comprising a computer readable storage medium configured to store capacitance data representing the expected capacitance of the capacitive intersection.

3. The readout device of claim 2, wherein the capacitive intersection is part of a capacitive sense matrix formed by a plurality of rows of conductors intersecting a plurality of columns of conductors, and wherein the capacitance data represents the expected capacitance between a row of the plurality of rows and a column of the plurality of columns.

4. The readout device of claim 3, wherein the capacitance data represents a plurality of expected capacitances between respective rows of the plurality of rows and respective columns of the plurality of columns.

5. The readout device of claim 3, wherein the capacitance data represents an expected capacitance corresponding to a segment of the capacitive sense matrix, the segment comprising a region of intersection of a plurality of rows and a plurality of columns.

6. The readout device of claim 5, wherein the segment corresponds to a corner of the capacitive sense array.

7. The readout device of claim 5, wherein the segment corresponds to an edge of the capacitive sense array.

8. The readout device of claim 1, wherein the integration circuit comprises:
    a differential amplifier having an input and an output, wherein said input is coupled to receive the first signal and the second signal; and
    an integration capacitor coupled between the input and output of the differential amplifier.

9. The readout device of claim 1, further comprising a series connection of an inverter and said capacitor having the variable capacitance value, said series connection coupled to receive said drive signal and output said second signal.

10. The readout device of claim 1, further comprising a memory circuit configured to store capacitance data representing an expected capacitance value of said capacitive intersection, wherein the variable capacitance value is set in accordance with the expected capacitance value from the stored capacitance data.

11. The readout device of claim 10, wherein the capacitive sense matrix comprises a plurality of rows of conductors and a plurality of columns of conductors, and wherein the capacitance data represents the expected capacitance value corresponding to a segment of the capacitive sense matrix, the segment comprising a region of intersection of at least one row of the plurality of rows and at least one column of the plurality of columns.

12. The readout device of claim 11, wherein the segment is a first segment and the capacitance data further represents an additional expected capacitance value corresponding to a second segment of the capacitive sense matrix, the second segment comprising a second region of intersection of at least one second row of the plurality of rows and at least one second column of the plurality of columns.

13. The readout device of claim 12, wherein the second region of intersection includes regions of intersection of at least two rows of the plurality of rows and at least two columns of the plurality of columns.

14. The readout device of claim 12, wherein the first segment corresponds to a corner of the capacitive sense array.

15. The readout device of claim 12, wherein the second segment corresponds to an edge of the capacitive sense array.

16. The readout device of claim 15, wherein the first segment corresponds to a corner of the capacitive sense array.

17. The readout device of claim 1, further comprising a computer readable storage medium configured to store capacitance data, and wherein the variable capacitance value is variably configured based upon the capacitance data stored in the computer readable storage medium.

18. The readout device of claim 17, wherein the variable capacitance value is variably configured based upon capacitance data corresponding to a capacitive portion of the capacitive sense matrix selected for readout.

* * * * *